July 12, 1938.   H. KLEMM   2,123,429
MONOSPAR CANTILEVER AIRCRAFT WING
Filed July 27, 1937
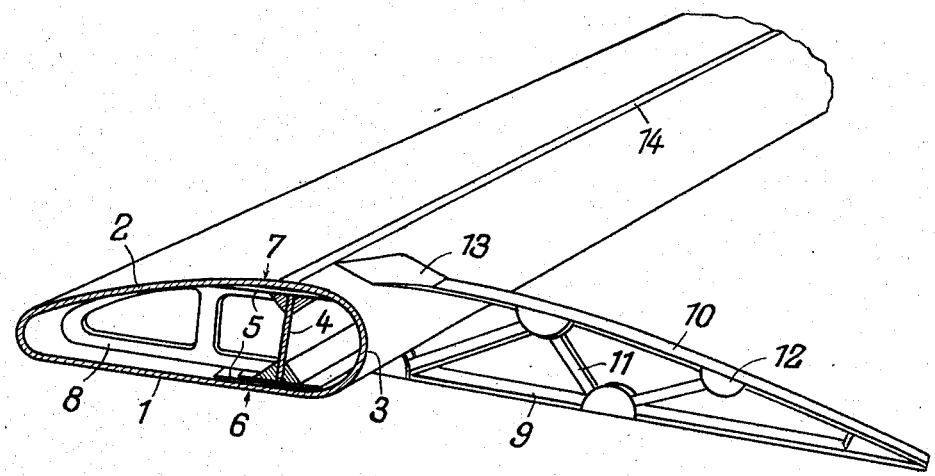
Hanns Klemm
Inventor:
By Otto Munk
his Atty.

UNITED STATES PATENT OFFICE 2,123,429

MONOSPAR CANTILEVER AIRCRAFT WING

Hanns Klemm, Boblingen, Germany

Application July 27, 1937, Serial No. 155,860
In Germany June 26, 1936

5 Claims. (Cl. 244—123)

This invention relates to aircraft wings, and it has for its object an improved construction of a wing for aircraft.

In cantilever aircraft wings the torsional stiffness and security against oscillation become increasingly important as flying speeds and surface load increase. In two-spar wings torsional stiffness has been achieved by fitting a covering over a foremost and a rearmost wing stringer so as to form hollow spars and filling out the intermediate portion with ribs disposed diagonally for the transmission of shear. In monospar wings use has been made of a strong box-spar running along the middle of the wing, or wing profiles having as far as possible fixed centers of pressure have been made, and a spar rigid against bending stresses has been fitted along the line of aerodynamic centers and additionally prevented from twisting by means of a wood or metal covering extending to the leading end of the profile, this, for example, also with an elliptical spar cross section.

The elimination of wing oscillations is due to the simultaneous presence of three factors:

(a) Great torsional stiffness of the wing (tubular spar);

(b) The axis of torsional stiffness of the wing is located as far as possible forward;

(c) The bending axis of the wing is as near as possible to the axis of torsional stiffness, even, if possible, in front thereof.

These three conditions are fulfilled in a very marked degree by the construction of wing constituting the invention.

The figure of the drawing is a perspective view with parts broken away.

According to the invention, I provide a wing construction characterized in that the forward portion of the wing profile, from the leading edge approximately to the thickest portion or at the most beyond it, up to the foremost third of the chord length, has the form of a spar of egg shaped hollow section, so as to be rigid under bending stresses and have, at the same time extremely high torsional resistance and an axis of inertia lying relatively near to the leading edge. This type of wing construction provides not only all the advantages of the known wings having plywood leading edges, namely a smooth non-buckling spar resisting to torsion, but in addition the resistance to buckling is substantially increased, the weight is still further slightly reduced, and besides this, the decisive advantage is obtained that all wing oscillations are practically eliminated and thus a fundamental increase in flying safety is achieved.

Preferably, the wing spar according to the invention embodies as a useful feature a longitudinal stay plate near the point of widest cross section of the wing and false-ribs extending therefrom to the leading edge, approximately corresponding to the ordinary wing ribs, to which are adjoined rearward false-ribs supporting an ordinary covering or skin. While these false-ribs render the spar particularly stiff against shear and thus resistant to torsion, the longitudinal stay plate, besides providing a substantial increase in the stiffness to bending derived from the fact that it bears a portion of the shear, also assists in enabling the correct shape of the wing to be accurately adhered to when making the spar, as, in determining the curved cross-sectional shape of the latter, the said longitudinal stay plate, being the only flat surfaced member, is available as a point of application of gauges, for accurate manufacture.

Preferably also, the spar consists of half-troughs, the joining seams of which lie at the top and bottom, near the greatest width in the cross section of the spar and in front of the longitudinal stay plate, when one is provided. This permits accurate manufacture of the individual half-troughs which then require only simple seam riveting (in the case of metal construction) or gluing (in the case of plywood construction), for the assembly to form the completely enclosed hollow body, these seams being at the flattest and most convenient parts of the spar, close to the longitudinal stay plate imparting the desired stiffening to the seams.

Powerful internal bracing along the cross-sectional ribs at the same time provides good torsional stiffening and considerable increase in the bending strength of the spar, together with excellent closing of the longitudinal seams and a good support for the longitudinal stay plate mentioned above.

Referring to the drawing left herewith, which illustrates diagrammatically, as an example of an embodiment of the invention, a portion of a spar with attached wing false rib:

The spar shown on the drawing may be constructed, for example, of plywood, and is composed of a lower surface member 1, an upper surface member 2, which both follow the wing profile, so as to form a leading half-trough, and a rear surface member 3, forming a nearly cylindrical half-trough, which is situated inside the wing, so that they form together an egg-shaped cross section. The two half-troughs 1—2 and 3 are made separately and are joined together by seams at 6 and 7. A flat longitudinal stay plate 4, which, in the wooden construction exemplified in the figure, is held in position by ordinary corner pieces 5', lies approximately at the widest portion of the cross section of the spar, corresponding to the flattest points of the spar contour, stiffened internally by longitudinal reinforcing strips 5. The strips 5 also cover the two seams 6 and 7 of the front and rear half-troughs. At suitably spaced points along the spar, false ribs 8 extend from the longitudinal stay plate 4 to the leading edge of the wing and, at the same points, false ribs also extend rearwards to the trailing edge of the wing.

These ribs, running to the trailing edge of the wing, consist of lower and upper flanges 10 and diagonal bracing stays 11, the whole being secured together at the nodal points by brackets 12 and connected to the spar by flat tongues 13. A narrow strip of plywood or metal 14 is also mounted on the spar to secure the forward edge of the covering fabric.

I claim:

1. Monospar cantilever aircraft wing comprising a hollow spar, having a substantially flat bottom, a substantially semicylindrical leading edge, a substantially semicylindrical trailing edge of a diameter larger than that of the leading edge, and a curved top wall sloping down from the upper edge of the trailing semicylinder to the upper edge of the leading semicylinder, the greatest thickness of the spar being approximately in a vertical section through the chord of the wing between the front third and the rear two-thirds thereof.

2. Monospar cantilever aircraft wing as claimed in claim 1, wherein the spar contains further a flat longitudinal stay plate near its greatest thickness, and false ribs extending from the said stay plate to the leading edge.

3. Monospar cantilever aircraft wing as claimed in claim 1, wherein the spar is strengthened by longitudinal reinforcing strips along the flattest parts of its cross-section.

4. Monospar cantilever aircraft wing as claimed in claim 1, wherein the spar is composed of a front and a rear half-trough having longitudinal seams at top and bottom near the greatest thickness of said spar.

5. Monospar cantilever aircraft wing as claimed in claim 1, wherein the spar contains further a flat longitudinal stay plate near its greatest thickness and is composed of a front and a rear half-trough united along longitudinal seams at top and bottom near the greatest thickness of said spar and forward of said longitudinal stay plate.

HANNS KLEMM.